United States Patent [19]

Eckhardt et al.

[11] Patent Number: 4,780,525
[45] Date of Patent: Oct. 25, 1988

[54] THERMOTROPIC, FULLY AROMATIC POLYESTERS WITH EXCELLENT FIGIDITY AND TOUGHNESS, A PROCESS FOR THEIR PREPARATION AND THEIR USE FOR THE PRODUCTION OF SHAPED ARTICLES, FILAMENTS, FIBRES AND FILMS

[75] Inventors: Volker Eckhardt; Hans-Rudolf Dicke; Ludwig Bottenbruch, all of Krefeld; Aziz E. Sayed, Leverkusen, all of Fed. Rep. of Germany

[73] Assignee: Bayer Aktiengesellschaft, Leverkusen, Fed. Rep. of Germany

[21] Appl. No.: 907,879

[22] Filed: Sep. 15, 1986

[30] Foreign Application Priority Data

Sep. 28, 1985 [DE] Fed. Rep. of Germany ....... 3534730

[51] Int. Cl.$^4$ .............................................. C08G 63/06
[52] U.S. Cl. ................................... 528/128; 528/125; 528/126; 528/183
[58] Field of Search ................ 528/128, 125, 126, 183

[56] References Cited

U.S. PATENT DOCUMENTS 4,539,386  9/1985  Yoon ..................................... 528/125

*Primary Examiner*—John Kight
*Assistant Examiner*—M. L. Moore
*Attorney, Agent, or Firm*—Connolly & Hutz

[57] ABSTRACT

Thermotropic, fully aromatic polyesters of p-hydroxybenzoic acid, 3,4'-benzophenone-dicarboxylic acid and certain bisphenols have a previously unknown combination of very high rigidity and high toughness.

9 Claims, No Drawings

THERMOTROPIC, FULLY AROMATIC POLYESTERS WITH EXCELLENT FIGIDITY AND TOUGHNESS, A PROCESS FOR THEIR PREPARATION AND THEIR USE FOR THE PRODUCTION OF SHAPED ARTICLES, FILAMENTS, FIBRES AND FILMS

The invention relates to high molecular weight thermotropic, fully aromatic polyesters with a very high rigidity, high toughness and good processability, a process for their preparation and their use for the production of shaped articles, filaments, fibres and films.

Those substances which form liquid crystal melts are described as "thermotropic". Thermotropic polycondensates are sufficiently known, compare, for example: F. E. McFarlane et al., Liquid Crystal Polymers II, Contemporary Topics in Polymer Science, Volume 2, Plenum Publishing Corporation 1977; W. J. Jackson and H. F. Kuhfuss, J. Polymer Science, Polymer Chem. Ed. 14, 2042 (1976); W. C. Wooten et al. in A. Ciferri "Ultra-high Modulus Polymers", Applied Science Publ., London 1979, page 362 et seq.; A. Blumstein et al., "Liquid Crystalline Order in Polymers", Academic Press 1978; J. Preston, Angew. Makromol. Chem. 109/110, pages 1–19 (1982); A. Ciferri, W .R. Krigbaum, R. B. Meyer "Polymer Liquid Crystals", Academic Press, New York, 1982; European Patent Nos. 1,185, 1,340, 8,855, 11,640, 15,856, 17,310, 18,145, 18,709, 22,344, 44,205. and 49,615; U.S. Pat. Nos. 3,991,013, 3,991,014, 4,066,620, 4,067,852, 4,083,829, 4,107,143, 4,226,970, 4,232,143, 4,232,144, 4,245,082, 4,269,965, 4,335,232, 4,381,389, 4,399,270, 4,398,015, 4,447,592 and 4,500,699; Japanese Patent No. 59/126,431; and WO Nos. 79/797, 79/1,030 and 79/1,040.

The liquid crystalline state of polymer melts can be investigated with the aid of a polarization microscope: for the investigations, the eyepiece was equipped with an attachment which contained a photodiode located at the focal point of the eyepiece lens. With the aid of a subsequently connected measurement amplifier with a regulating device, the measurement value on the switched-on microscope was adjusted to 100 scale divisions in the absence of a sample of material, with the Nicol prisms arranged in parallel. Crossed Nicol prisms then resulted in a value of 0.01 scale divisions.

The polycondensates were investigated after mounting the samples at temperatures between 280° and 400° C. If a brightening of the melt observed between the crossed Nicol prisms occurred in this entire range or in a part thereof, the polycondensate was classified as a thermotropic liquid crystal polycondensate.

In the measurement arrangement, liquid crystal polycondensates show values above 1 scale division, usually values from 3 to 90 scale divisions. In contrast, for amorphous melts, for example aromatic polycarbonates, values of less than 0.1 scale division were found.

The method described above is particularly suitable for rapid determinations in the laboratory and gives unambiguous results in almost all cases. In cases of doubt, on the other hand, it may be appropriate to demonstrate the presence of liquid crystal components by means of X-ray diffraction in the melt, such as is described, for example, by G. W. Gray and P. A. Windsor, "Plastic Crystals, Physico-Chemical Properties and Methods of Investigation", in particular Chapter 3, John Wiley and Sons, New York, Sydney, Toronto 1974.

Shaped articles produced from liquid crystal melts have rigidities such as are not usually found with nonreinforced polycondensates processed from isotropic melts; however, the toughness of such shaped articles leaves something to be desired (compare U.S. Pat. No. 4,242,496, European Patent No. A-44,175; and W. J. Jackson Jr., Brit. Polym. J. 12, 154 (1980)). It has been confirmed by our own ivestigations that thermotropic polyesters of high rigidity, that is to say a high modulus of elasticity, as a rule have a lower toughness and thermotropic polyesters of high toughness as a rule have a less pronounced rigidity.

U.S. Pat. No. 4,500,699 describes, inter alia, thermotropic polyesters of terephthalic acid, substituted hydroquinones and 3,4'-benzophenonedicarboxylic acid; Japanese Patent No. 59/126,431 claims thermotropic polyesters of hydroquinone, 3,4'-diphenylether-dicarboxylic acid and 3,4'-benzophenonedicarboxylic acid. The rigidity values measured on these polyesters do not seem very high, taking into consideration that the measurements have been made on thin fibres. In both cases, no information is given on the toughness.

The object of the present invention was thus to provide thermotropic, completely aromatic polyesters which can easily be processed as thermoplastics and have a previously unknown combination of very high rigidity and high toughness.

Preferred new thermotropic, completely aromatic polyesters should have a modulus of elasticity in tension of at least 15,000 MPa, preferably at least 20,000 MPa and particularly preferably at least 25,000 MPa.

The impact strength of preferred polyesters should be at least 20, preferably at least 25 and particularly preferably at least 30 kJ/m$^2$, and the notched impact strength should be at least 10, preferably at least 15 and in particular at least 20 kJ/m$^2$.

Preferred new thermotropic, completely aromatic polyesters should be processable as thermoplastics at a temperature below 370° C., preferably below 350° C. and in particular below 330° C.

Surprisingly, it has been found that completely aromatic polyesters which contain co-condensed radicals of p-hydroxybenzoic acid, 3,4'-benzophenonedicarboxylic acid and certain diphenols have the desired combination of advantageous properties.

The present invention relates to thermotropic, completely aromatic polyesters with recurring units of the formulae

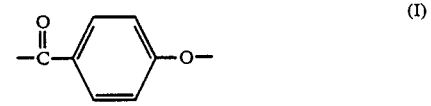 (I)

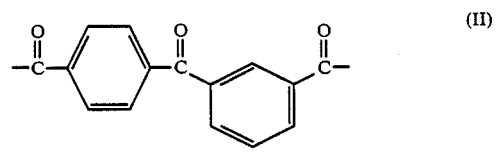 (II)

and

 (III)

wherein Ar consists to the extent of 0 to 90, preferably 50 to 80 mol % of 1,4-phenylene radicals and to the extent of 100 to 10, preferably 50 to 20 mol % of other bivalent aromatic radicals containing 6 to 18 C atoms, or mixtures thereof, the chain lengthening bonds of which are opposed coaxially or in parallel to the extent of 50 to 100 mol % and angled to the extent of 50 to 0 mol %, and which can be substituted by $C_1$–$C_4$-alkoxy groups or halogen atoms, with the proviso that the molar ratio of I/II is 0.66–4.0, preferably 1.0–3.0 and in particular 1.2–2.3, and the molar ratio of II/III is 0.95–1.05, preferably 0.98–1.02 and in particular 1.0.

If diphenols containing radicals Ar, the chain-lengthening bonds of which are angled or which are substituted, are used, the amount which causes the resulting polyester to lose its thermotropic properties is not exceeded.

Preferred diphenols which lead to units III in which Ar is not a 1,4-phenylene radical are, for example, 4,4′-dihydroxyphenyl, 1,4-, 1,5-, 2,6- and 2,7-naphthalenediol, chlorohydroquinone, methylhydroquinone, phenylhydroquinone, resorcinol, bisphenol A, o,o,o′,o′-tetramethyl-, -chloro- or -bromobisphenol A, 4,4′-dihydroxyphenyl ether, 4,4′-dihydroxydiphenyl sulphone, 4,4′-dihydroxyphenyl ketone, 4,4′-dihydroxydiphenyl sulphide and mixtures of the compounds mentioned. 4,4′-Dihydroxydiphenyl is particularly preferred.

The polyesters according to the invention can contain up to 10 mol % of carbonate groups, based on the sum of ester and carbonate groups, but are preferably free from carbonate groups.

The polyesters according to the invention can contain the radicals I in random distribution, in segments or in blocks.

The polyesters according to the invention can contain —COOH, —H, —OH, —OC$_6$H$_5$, acyloxy or radicals originating from chain stoppers as end groups. Preferred chain stoppers are monofunctional aromatic hydroxy compounds, such as 4-hydroxydiphenyl, p-nonylphenol, 4-(1,1,3,3-tetramethylbutyl)-phenol, β-naphthol and aromatic monocarboxylic acids, such as diphenylcarboxylic acids and naphthalenecarboxylic acids. Chain stoppers can be employed in amounts of 0.5–5 mol %, in the case of carboxylic acids based on the sum of the radicals I and II and in the case of phenols based on the radicals I and III.

Branching monomers which are trifunctional or more than trifunctional - preferably aromatic monomers - can also be used in amounts of 0.1–1 mol %, based on the sum of the radicals I, II and III, such as, for example, phloroglucinol, 1,3,5-benzenetricarboxylic acid and 3,5-dihydroxybenzoic acid.

The polyesters according to the invention as a rule have an intrinsic viscosity of at least 0.5, preferably at least 1.0 dl/g (measured on a solution of 5 mg of polyester/ml of p-chlorophenol at 45° C.). Should the polyesters be insoluble in p-chlorophenol, it is assumed that they have the stated minimum viscosity; they are thus according to the invention if they meet the parameters of the main claim.

The polyesters according to the invention preferably have a melt viscosity of less than 1,000 Pa.s, measured at a shear rate of $10^3$ s-1 using a nozzle with a length/diameter ratio of 20 at a temperature of less than 370° C.

The polyesters according to the invention can be prepared by various processes, for example by condensation or transesterification of the hydroxycarboxylic acids, dicarboxylic acids and diphenols derived from the radicals I, II and III, or of their reactive derivatives, and subsequent polycondensation.

Examples of preferred starting compounds are their aryl esters, their acyl esters and their acid chlorides.

In a preferred synthesis process, the aryl esters, preferably the phenyl esters, of the carboxylic acids derived from the radicals I and II are reacted with the diphenols derived from the radicals III, it also being possible for the phenyl esters to be produced in situ.

The radicals I, II and III are incorporated into the polyesters in the ratio of the starting components.

It may be advantageous to accelerate both the condensation or transesterification reaction and the polycondensation reaction by catalysis. Such catalysts are, as is known, for example, Lewis acids and hydrogen halide acids; oxides, hydrides, hydroxides, halides, alcoholates, phenolates, salts of inorganic or organic acids (preferably carboxylic acid salts), complex salts or mixed salts of the alkaline earth metals, such as, for example, magnesium and calcium; of the sub-group elements, such as, for example, vanadium, titanium, manganese, cobalt, nickel, zinc, lanthanum, cerium or zirconium, or of the elements from other groups of the periodic table, such as, for example, germanium, tin, lead and antimony, or also alkali metals or alkaline earth metals themselves, in particular sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadyl $C_1$–$C_8$-alkoxides, titanium alkoxides, such as titanium tetrabutylate and titanium tetrapropylate, alkoxy-titanium silicates, zirconium butylate, zirconium propylate, titanium tetraphenolate, sodium phenolate, germanium dioxide, antimony trioxide, dialkyl- and diaryl-tin oxide, dibutyl-tin diacetate and dibutyl-dimethoxy-tin.

The amounts of catalyst are preferably 0.001–1, in particular 0.01–0.2% by weight, based on the total weight of the monomers employed.

The polyesters according to the invention can be prepared at temperatures from 150° to 380° C., the reaction in general being started at low temperatures and the temperature being increased continuously in the course of the advancement of the reaction. When the rate of reaction decreases, a vacuum can be applied, the pressure preferably being reduced continuously from normal pressure to about 0.1 mbar.

The resulting product can - preferably in granular form - be subjected to solid phase post-condensation under reduced pressure at temperatures from 200° to 300° C.; after 1 to 25 hours, the molecular weight has increased and the resulting properties of the polyester have noticeably improved.

The invention furthermore thus relates to a process for the preparation of the new polyesters by reaction of the hydroxycarboxylic acids, dicarboxylic acids and diphenols derived from the radicals I, II and III, or of their reactive derivatives, which can also be prepared in situ, if appropriate in the presence of catalysts, chain stoppers and branching agents, at temperatures from 150°–380° C., if appropriate under reduced pressure.

As a result of their relatively low melt viscosity, the thermotropic polyesters according to the invention can advantageously be processed from the melt to injection-moulding components, filaments, fibres, tapes and films, a molecular orientation being achieved by the shearing forces occurring and being influenced to a high degree by the intensity of the shearing forces. They furthermore exhibit a marked structural viscosity, that is to say the melt viscosity decreases greatly is the shearing forces increase. Suitable processing methods are injection moulding, extrusion, pressing and melt spinning.

Mouldings with excellent rigidity and toughness, a good heat distortion point and high dimensional stability can be produced from the polyesters according to the invention. Since the polyesters are exceptionally resistant towards chemicals and flame-retardant, they are preferably suitable for the production of
- electrotechnical articles, such as, for example, insulators, printed circuits, plug contacts and dashboard parts,
- components of chemico-technical apparatuses, such as, for example, tubes, vessel linings, rotors, friction bearings and seals,
- components of the interior decor of aircraft,
- components of medico-technical equipment, such as, for example, structural components of air-conditioning plants and valve components.

The polyesters according to the invention can, however, also be used as a covering and coating material (in pulverulent or disperse form). They are also most suitable for the preparation of reinforced or filled moulding compositions with a reinforcer or filler content of 5–65% by weight, based on the reinforced or filled moulding composition.

The invention furthermore thus relates to the use of the new polyesters for the production of shaped articles, filaments, fibres and films.

EXAMPLES

Testing of the impact strength $a_n$ and notched impact strength $a_k$ was carried out on standard small bars in accordance with DIN 53 453 (ISO/R 179) at 23° C. on in each case 10 test pieces. The flexural strength was determined on standard small bars in accordance with DIN 53 452 (ISO R 178). The modulus of elasticity in tension and modulus of elasticity in flexure were determined in accordance with DIN 53 457. The heat distortion was measured by determining the Vicat B softening point in accordance with DIN 53 460 (ISO 306).

EXAMPLE 1

The following substances were weighed into a 1 l vessel with a ground glass flange, which had been flushed with nitrogen and heated thoroughly and was equipped with a ground glass lid, stirrer, nitrogen inlet and distillation attachment: 128.5 g of phenyl-p-hydroxybenzoate (0.60 Mole), 169.0 g of diphenyl -3,4'-benzophenonedicarboxylate (0.40 mole), 22.0 g of hydroquinone (0.20 mole), 37.2 g of 4,4'-dihydroxydiphenyl (0.20 mole) and 0.2 g of titanium tetraisopropylate solution in chlorobenzene (1% strength by weight).

The reaction mixture was melted at 250° C. by means of a salt bath, under a gentle stream of nitrogen. Phenol was distilled off over a period of 2.5 hours by increasing the temperature stepwise up to 360° C. The initially clear melt thereby became cloudy.

To bring the conversion to completion, the pressure was then reduced in several stages down to about 1 mbar in the course of 1.5 hours.

The pale grey reaction product with an intrinsic viscosity of 2.7 dl/g was ground and subjected to solid phase post-condensation at 240° C. (15 hours under a pressure of 1 mbar). The polyester thus obtained was insoluble in p-chlorophenol and had an optically anisotropic melt phase in the range from 310° to 400° C.

EXAMPLES 2–9

The reaction apparatus described in Example 1 and the process described there were used to prepare the polyesters listed in Table 1.

TABLE 1

| Example | PHB (Mol-%) | 3,4'-BDC (Mol-%) | Hy (Mol-%) | DOD (Mol-%) | 2,6-ND (Mol-%) | RES (Mol-%) | intrinsic viscosity* (dl/g) | anisotropic phase (°C.) |
|---|---|---|---|---|---|---|---|---|
| 2 | 55 | 45 | 22.5 | 22.5 | — | — | 1.62 | 315–400 |
| 3 | 65 | 35 | 17.5 | 17.5 | — | — | 1.45 | 285–400 |
| 4 | 70 | 30 | 15 | 15 | — | — | 1.34 | 315–400 |
| 5 | 60 | 40 | 24 | 16 | — | — | 1.93 | 320–400 |
| 6 | 60 | 40 | 28 | 12 | — | — | 1.47 | 330–400 |
| 7 | 60 | 40 | 32 | 8 | — | — | 1.27 | 350–400 |
| 8 | 60 | 40 | 20 | — | 20 | — | 1.15 | 300–400 |
| 9 | 60 | 40 | 30 | — | — | 10 | 0.82 | 340–400 |

PHB = p-hydroxybenzoic acid
3,4'-BDC = 3,4'-benzophenonedicarboxylic acid
Hy = hydroquinone
DOD = 4,4'-dihydroxydiphenyl
2,6-ND = 2,6-naphthalenediol
RES = resorcinol
*measured before the solid phase post-condensation (all the post-condensed products had a poor solubility).

Standard small bars and tension bars were produced from the polyesters of Examples 1–9 by injection moulding for testing of the mechanical properties. The polyesters were processed at temperatures between 300° and 370° C. The values measured are listed in Table 2.

TABLE 2

| Example | Modulus of elasticity in flexure (MPa) | Flexural strength (MPa) | Modulus of elasticity in tension (MPa) | $a_n/a_k$ (kJ/m$^2$) | Vicat B Temperature (°C.) |
|---|---|---|---|---|---|
| 1 | 16300 | 243 | 28200 | 44/24 | 160 |
| 2 | 11500 | 207 | 34100 | 49/32 | 155 |
| 3 | 15500 | 227 | 26100 | 35/19 | 173 |
| 4 | 11800 | 170 | 18900 | 29/16 | 181 |
| 5 | 17100 | 210 | 27600 | 39/25 | 169 |
| 6 | 14700 | 198 | 23200 | 35/19 | 175 |
| 7 | 10500 | 165 | 21100 | 21/14 | 184 |
| 8 | 13700 | 207 | 22300 | 32/27 | 165 |

TABLE 2-continued

| Example | Modulus of elasticity in flexure (MPa) | Flexural strength (MPa) | Modulus of elasticity in tension (MPa) | $a_n/a_k$ (kJ/m$^2$) | Vicat B Temperature (°C.) |
| --- | --- | --- | --- | --- | --- |
| 9 | 9700 | 153 | 16700 | 26/12 | 161 |

We claim:

1. Theremotropic, fully aromatic polyesters with recurring units of the formulae

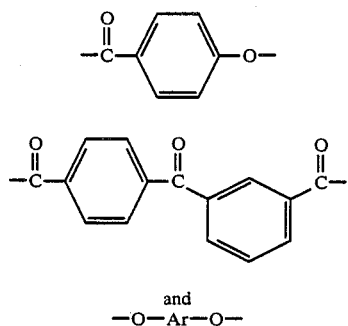

and

—O—Ar—O—    (III)

wherein Ar consists to the extent of 0 to 90 mol % of 1,4-phenylene radicals and to the extent of 100 to 10 mol % of other bivalent aromatic radicals containing 6 to 18 C atoms, or mixtures thereof, the chain-lengthening bonds of which are opposed coaxially or in parallel to the extent of 50 to 100 mol % and angled to the extent of 50 to 0 mol %, and which can be substituted by $C_1$–$C_4$-alkoxy groups or halogen atoms, with the proviso that the molar ratio of I/II is 0.66–4.0 and the molar ratio of II/III is 0.95–1.05.

2. Polyesters according to claim 1, characterized in that the molar ratio of I/II is 1.0–3.0.

3. Polyesters according to claim 1, characterized in that the molar ratio of I/II is 1.2–2.4.

4. Polyesters according to claims 1, characterized in that Ar consists to the extent of 50 to 80 mol % of a 1,4-phenylene radical and to the extent of 50 to 20 mol % of other bivalent aromatic radicals containing 6 to 18 C atoms, or mixtures thereof, the chain-lengthening bonds of which are opposed coaxially or in parallel to the extent of 50 to 100 mol % and angled to the extent of 50 to 0 mol %, and which can be substituted by $C_{1-C_4}$-alkoxy groups or halogen atoms.

5. Polyesters according to claim 1, characterized in that Ar consists of a mixture of 1,4-phenylene radicals and 4,4'-biphenylene radicals.

6. Polyesters according to claim 1, characterized in that Ar consists of a mixture of 1,4-phenylene radicals and 4,4'-biphenylene radicals in molar ratios of 2/1 to 1/2.

7. Process for the preparation of the polyesters according to claim 1 by reaction of the hydroxycarboxylic acids, dicarboxylic acids and diphenols with the radicals I–III, or of their reactive derivatives, which can also be prepared in situ, if appropriate in the presence of chain stoppers, branching agents and catalysts, at temperatures from 150°–380° C., if appropriate under reduced pressure.

8. Process according to claim 7, characterized in that it is followed by solid phase post-condensation.

9. A shaped article, filament, fiber or film comprising the polyesters according to claim 1.

* * * * *